United States Patent [19]
Yoshimoto et al.

[11] Patent Number: 5,128,785
[45] Date of Patent: Jul. 7, 1992

[54] LIQUID CRYSTAL DISPLAY DEVICE SUBSTANTIALLY FREE FROM CROSS-TALK HAVING VARISTOR LAYERS COUPLED TO SIGNAL LINES AND PICTURE ELECTRODES

[75] Inventors: Hataaki Yoshimoto, Chiba; Katsuhiro Ito; Hiroyuki Mori, both of Ichihara, all of Japan

[73] Assignee: Ube Industries, Ltd., Yamaguchi, Japan

[21] Appl. No.: 563,184

[22] Filed: Aug. 6, 1990

[30] Foreign Application Priority Data

| | | | |
|---|---|---|---|
| Aug. 8, 1989 | [JP] | Japan | 1-203751 |
| Sep. 27, 1989 | [JP] | Japan | 1-249000 |
| Sep. 27, 1989 | [JP] | Japan | 1-249001 |
| Sep. 27, 1989 | [JP] | Japan | 1-249002 |
| Sep. 28, 1989 | [JP] | Japan | 1-250721 |
| Sep. 28, 1989 | [JP] | Japan | 1-250722 |
| Oct. 3, 1989 | [JP] | Japan | 1-256955 |
| Oct. 12, 1989 | [JP] | Japan | 1-263953 |

[51] Int. Cl.⁵ ............................. G02F 1/133
[52] U.S. Cl. ..................... 359/58; 359/57; 359/51; 359/79; 359/87; 340/784
[58] Field of Search ........... 350/333, 332, 334, 336, 350/339 R, 331 R; 340/784

[56] References Cited

U.S. PATENT DOCUMENTS

| | | | |
|---|---|---|---|
| 4,233,603 | 11/1980 | Castleberry | 350/333 |
| 4,435,047 | 3/1984 | Fergason | 350/334 |
| 4,460,623 | 7/1984 | Levinson | 350/334 |
| 4,490,014 | 12/1984 | Levinson | 350/334 |
| 4,525,709 | 7/1985 | Hareng et al. | 350/332 |
| 4,535,327 | 8/1985 | Hareng et al. | 340/784 |
| 4,699,470 | 10/1987 | McLaughlin et al. | 350/334 |
| 5,066,105 | 11/1991 | Yoshimoto et al. | 359/58 |

FOREIGN PATENT DOCUMENTS

| | | | |
|---|---|---|---|
| 0361420 | 4/1990 | European Pat. Off. | 340/784 |
| 2561423 | 9/1985 | France | |
| 56-14294 | 2/1981 | Japan | |

OTHER PUBLICATIONS

D. E. Castleberry "Varistor Controlled Multiplexed Liquid Crystal Display", Conference Record of the 1978 Biennial Display Research Conference, N.Y., U.S.A.-Oct. 1978-pp. 42-43.

D. E. Castleberry "Varistor-Controlled Liquid-Crystal Displays" IEEE Transactions on Electron Devices, vol. ED 26, No. 8, Aug. 1979-pp. 1123-1128.

Castleberry-"Control Layers for Liquid Crystal Matrix Displays" IEEE 1980 Biennial Display Research Conference-1980-pp. 89-92.

*Primary Examiner*—Stanley D. Miller
*Assistant Examiner*—Tai V. Duong
*Attorney, Agent, or Firm*—Finnegan, Henderson, Farabow, Garrett & Dunner

[57] ABSTRACT

A liquid crystal display device capable of displaying clear images without cross-talk, comprises (a) a first transparent base, (b) a plurality of picture element electrodes on the first base (a), (c) a plurality of signal lines on the first base (a), (d) a plurality of varistor layers connecting the picture element electrodes (b) to the signal lines (c) therethrough, (e) a second transparent base in parallel to the first base (a), (f) a plurality of electrodes on the second base (e), and (g) a liquid crystal material layer arranged between the picture element electrodes (b) and the electrode (f), and is characterized in that portions of the varistor layer connecting the signal lines (c) and the adjacent picture element electrode (b) have a threshold value voltage ($V_{th}$) smaller than a minimum voltage ($V_{min}$) at which an electric current is allowed to flow from the signal lines (c) to the electrodes (f) through at least portions of the varistor layers extending from the signal lines (c) toward the electrodes (f).

15 Claims, 3 Drawing Sheets

LIQUID CRYSTAL DISPLAY DEVICE SUBSTANTIALLY FREE FROM CROSS-TALK HAVING VARISTOR LAYERS COUPLED TO SIGNAL LINES AND PICTURE ELECTRODES

BACKGROUND OF THE INVENTION

1. Field of the Invention

The present invention relates to a liquid crystal display device free from cross-talk. More particularly, the present invention relates to a liquid crystal display device having a liquid crystal material layer wherein liquid crystals are dispersed in a matrix comprising a polymeric material, which is substantially free from "cross-talk" and can exhibit a high brightness.

2. Description of the Related Arts

It is known that liquid crystal display (LCD) device can be directly operated by using an IC device under a low drive voltage at a low power consumption, and can be easily constructed as a compact and thin device. In particular, TN type LCD devices are advantageous in that they can be operated under a low voltage at a low power consumption, and thus are widely utilized in various fields; for example, watches and desk-type electronic calculators.

The recent growing popularity of word processors, personal computers and other data processing devices has led to a demand for portable, small and thin devices of this kind, and to this end, LCD devices are replacing the cathode ray tube (CRT) devices as the display element in those machines. With the LCD device, it is necessary to reproduce the images of Chinese characters on the screens of those information-processing machines, since a great number of picture elements must be used in the LCD device in comparison with the number of the picture elements in the display devices for watches and desk calculators. Also, the LCD device can be operated by a simple matrix drive circuit in which a number of picture element electrodes are connected to signal lines in an X-Y matrix form. In this type of simple matrix drive system, the electrodes corresponding to the picture elements are not independent from each other, and thus when a predetermined voltage is applied to one picture element electrode, the voltage is also applied to the adjacent picture element electrodes, whereby the adjacent picture element electrodes are partly operated, i.e., an undesirable "cross-talk" occurs between the adjacent picture element electrodes.

To eliminate this cross-talk, it is known to utilize a non-linear element consisting of a diode, for example, a metal-insulator-metal diode (MIM), thin film transistor (TFT), or varistor for each picture element electrode, but it is very difficult to provide and arrange a large number, for example, several thousands to several hundreds of thousands, of diodes or thin film transistors corresponding to a large number of picture elements, all of which must have uniform properties and be free from defects, and thus there is an urgent need for the development of non-linear elements which can be easily provided with a uniform quality and will allow the use of an LCD device with a large display area.

In connection with the above, a new type of liquid crystal material usable for a display in a large area has been developed, through a new technology involving a polymer dispersed liquid crystal material, for example, an NCAP (nematic curvilinear aligned phase) type liquid crystal material containing a number of small liquid crystal particles dispersed in a polymeric matrix, or a liquid crystal composite membrane having a continuous phase liquid crystal contained in a polymeric matrix in the network form.

With this technology, it is now possible to easily control the thickness of the liquid crystal material layer in the display device, and therefore, the polymer-dispersed liquid crystal material can be formed as a layer having a large surface area, exhibits a very quick response, and allows the resultant display device to be given a wide angle of view without the use of a polarizer plate, and thus can be advantageously utilized to provide an LCD device having a large display surface area.

Nevertheless, the polymer-dispersed liquid crystal material is disadvantageous in that this liquid crystal material requires a drive voltage of from several tens to several hundreds of volts, which is remarkably higher than that of the TN type liquid crystal material, e.g., 5 volts or less. Therefore, a new-type of non-linear element which has a higher voltage resistance than that of conventional non-linear elements, for example, thin film elements, and can be driven at a low drive voltage, must be used for the polymer dispersed LCD device.

The inventors of the present invention attempted to provide a new-type of liquid crystal display device which has the polymer-dispersed liquid crystal material layer and in which a membrane consisting essentially of varistor particles is utilized as a non-linear element. This type of LCD device can display clear images or pictures without the occurrence of cross-talk, even where the device is operated at a high drive voltage.

Nevertheless, this type of display device is disadvantageous in that, when an outside surface of a varistor layer formed on a signal line and a picture element electrode is close to a scanning electrode, or is not well insulated from the scanning electrode, an electric current sometimes flows from the signal line to the scanning electrode through the varistor layer, or from the picture element electrode to the scanning electrode through the varistor layer, whereby a voltage between the picture element electrode and the scanning electrode is reduced, and the brightness of the display device is reduced. The above-mentioned disadvantages become significant with a decrease in the thickness of the liquid crystal material layer.

Usually, the varistor layer forms a convexity on a base plate in the display device.

Also, in general, preferably the liquid crystal material layer is as thin as possible, so that the resultant LCD device can be operated under a low drive voltage.

When the thickness of the liquid crystal material layer is reduced, the outside face of the varistor layer in the form of a convexity on the base plate is very close to or comes into contact with the scanning electrode on the opposite base plate, and if the thickness of the varistor layer is reduced to avoid the above-mentioned disadvantages, the deviation in the varistor voltage is increased, and thus the contrast of each picture element becomes uneven.

SUMMARY OF THE INVENTION

An object of the present invention is to provide a liquid crystal display device substantially free from cross-talk and capable of exhibiting a high brightness.

Another object of the present invention is to provide a liquid crystal display device capable of being operated under a drive voltage as low as possible with an even contrast of each picture element and without increasing the deviation in the varistor voltage.

The above-mentioned objects can be attained by the liquid crystal display device of the present invention which comprises:
- a first transparent base;
- a plurality of picture element electrodes arranged on the first base;
- a plurality of signal lines for supplying electric signals to the picture element electrodes, and arranged adjacent to and spaced from the picture element electrodes on the first base;
- a plurality of varistor layers comprising fine varistor particles, through which the picture element electrodes are connected to the adjacent signal lines;
- a second transparent base arranged in parallel to and spaced from the first base;
- a plurality of electrodes arranged on the second base, facing and spaced from the picture element electrodes; and
- a liquid crystal material layer arranged between the picture element electrodes and the scanning electrodes;
- said varistor layers connecting the signal lines and the adjacent picture element electrodes and exhibiting a threshold value voltage ($V_{th}$) smaller than a minimum voltage ($V_{min}$) under which an electric current is allowed to flow between the signal lines on the first base and the electrodes on the second base through at least portions of the varistor layers extending from the signal lines toward the electrodes on the second base.

Usually, the electrodes on the second base are utilized as scanning electrodes. The signal lines on the first base, however, may be utilized for scanning.

DESCRIPTION OF THE PREFERRED EMBODIMENTS

Figure 1A:
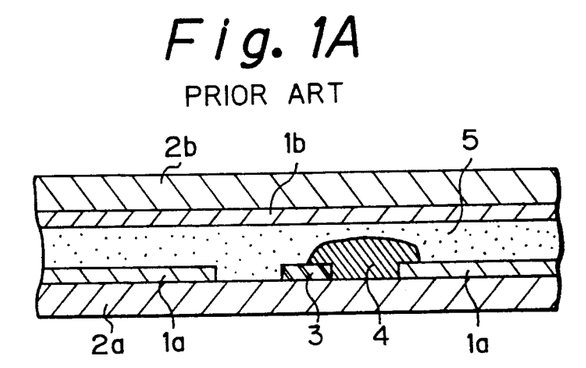
FIG. 1A shows an explanatory cross-sectional view of a conventional liquid crystal display (LCD) device.
Figure 1B:
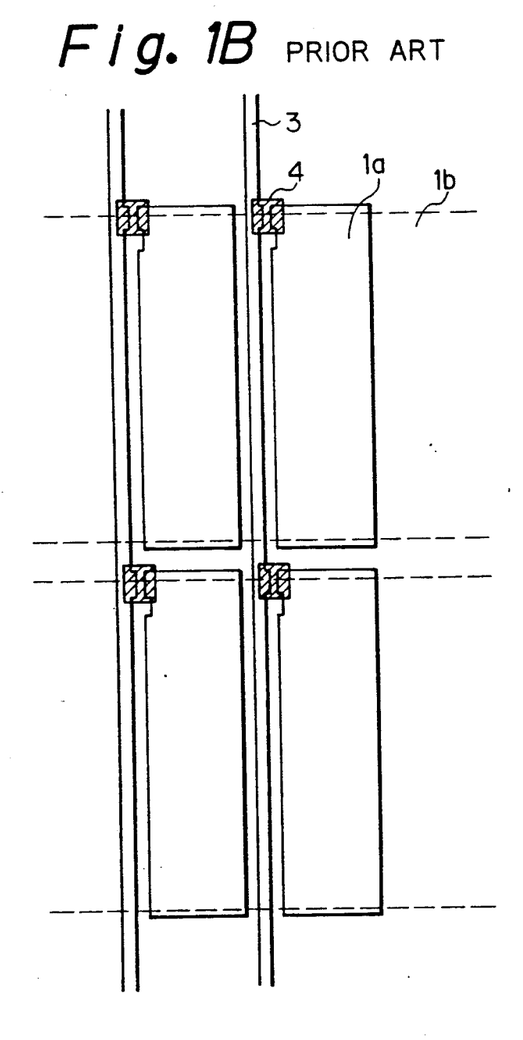
FIG. 1B shows an arrangement of picture element electrodes, signal lines and non-linear elements in a conventional LCD device as shown in FIG. 1A.

FIGS. 1A and 1B are a partial cross-sectional view and a plane view of an example of conventional liquid crystal display device having a polymer-dispersed liquid crystal material layer, respectively.

In FIGS. 1A and 1B, a plurality of picture element electrodes 1a are arranged in a predetermined pattern on an upper face of a first transparent base 2a; a plurality of signal lines 3 for supplying electric signals to the picture element electrode 1a are arranged adjacent to the picture element electrodes 1a on the first base 2a; a plurality of non-linear elements each consisting of a varistor layer 4 are arranged on the first base 2a so as to electrically connect the signal lines 3 with the adjacent picture element electrodes 1a; a second transparent base 2b is arranged in parallel to and spaced from the first base 2a; a plurality of transparent scanning electrodes 1b are fixed to the lower face of the second base 2b; and the space between the first base 2a and the second base 2b is filled by a liquid crystal material 5.

In this LCD device, the varistor layers 4 at least partially face the corresponding scanning electrodes 1b through the liquid crystal material layer 5, at a right angle from the first and second bases 2a and 2b.

Figure 2:
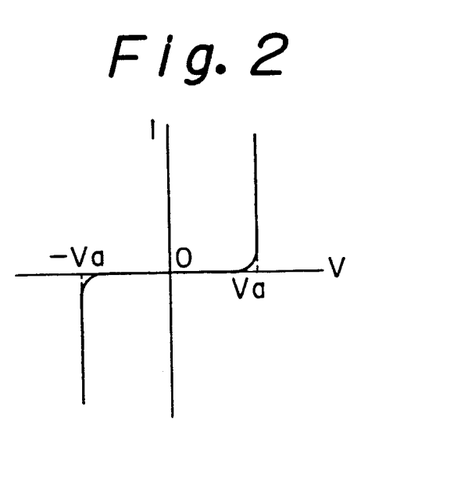
FIG. 2 shows a voltage-current curve of a varistor.

The varistor is usually used as a surge-absorbing element and satisfies a specific relationship between a voltage (V) and an electric current (I) as shown in FIG. 2.

Referring to FIG. 2, the varistor exhibits a high resistance under a voltage having a value less than a specific value Va, and substantially does not allow an electric current to flow therethrough. When the voltage reaches the value Va, however, the varistor exhibits a significantly reduced resistance and allows the electric current to flow therethrough, as shown in FIG. 2. The specific voltage value Va is referred to as a threshold value voltage $V_{th}$ or a varistor voltage. This varistor voltage and capacity can be easily controlled by controlling the distance between electrodes or the size of the varistor particles, and thus the varistor is usable in various fields, for example, as a protective material for electronic circuits and against lightening.

The varistor usable for the present invention is preferably in the form of a layer or film consisting of fine varistor particles. The layer of the fine varistor particles can be easily formed between the signal lines and the adjacent picture element electrodes by printing a paste comprising the fine varistor particles. This printing method is advantageous in that the operation of forming the varistor layer is simple and easy, and a number of non-linear elements having a uniform quality can be provided at a low cost.

When a number of fine varistor particles having a substantially uniform size and a substantially spherical shape are used, the resultant varistor layers connecting the signal lines and the adjacent picture elements electrodes exhibit a substantially uniform varistor voltage ($V_{th}$), and thus the resultant display device can produce a satisfactorily uniform display.

The varistor particles preferably have a size of 1 to 30 μm, more preferably 2 to 20 μm. When the varistor particles are too large, the resultant varistor non-linear element has an excessively large thickness, and such a thick element requires a thick liquid crystal material layer, and thus an excessively high drive voltage. When the size of the varistor particles is too small, the distances between the signal lines and the adjacent picture element electrode must be shortened and this short distance makes it difficult to form precise gaps between the signal lines and the adjacent picture element electrodes.

The varistor layer or film can be produced by the following procedures.

Zinc oxide powder is molded into pellets under a pressure of 50 to 500 kg/cm² and sintered at a temperature of 700° C. to 1300° C., the sintered pellets are pulverized to provide zinc oxide fine particles having a size of 1 to 30 μm, preferably 2 to 20 μm, and the fine particles are further sintered at a temperature of 800° C. to 1300° C. to produce spherical particles.

The sintered spherical zinc oxide particles are doped with at least one member selected from $Bi_2O_3$, $Co_2O_3$, $MnO_2$, and $Sb_2O_3$, preferably in an amount of 0.1% to 10% based on the weight of the ZnO particles, at a temperature of 700° C. to 1300° C.

Preferably, the varistor particles are spherical and have an even size, as such varistor particles will form a non-linear element having a uniform threshold value voltage, and thus the resultant LCD device will display a clear picture.

The varistor layer bridges the picture element electrode and the adjacent signal line but does not completely cover the picture element electrode, and therefore, the LCD device of the present invention having the varistor layer can be used as a light transmission type device.

The resultant varistor particles are mixed with a binding material consisting of, for example, glass particles and/or an organic binder in an amount of 2% to 200% based on the weight of the varistor, to provide a printable varistor paste.

The organic binder is selected from evaporation-drying type binders which can be solidified by drying, and hardening type binders which can be solidified by curing.

The evaporation-drying type binders include cellulosic materials such as methyl cellulose, ethyl cellulose, cellulose triacetate, polyacrylic resins, for example, polymethyl methacrylate, vinyl acetate polymer and copolymer, and polyvinyl alcohol. The binder may contain a small amount of a solvent or plasticizer.

The hardening binder may be selected from room temperature-hardening binders, for example, epoxy binders (for example, DP-pure 60, made by 3M) and silicone binders (for example, TSE 352, made by Toshiba Silicone); thermal-hardening binders for example, epoxy binders (for example, JA-7434, made by 3M), an silicone binders (for example, Epoxy TSJ, 3155, which are heat-hardening type binders; photohardening monomers, for example, 2-ethylhexyl acrylate and dicyclopentenyl acrylate; photohardening prepolymers, for example, polyesteracrylate, epoxyacrylate, and mixtures of the above-mentioned substances. Preferably, the photohardening type binders containing a monomer and/or a prepolymer are used for the present invention, and further, radiation-hardening or electronic ray hardening binders are used for the present invention.

The varistor paste is applied, by a printing method, to a first base having a plurality of picture element electrodes and signal lines, to form a bridge therebetween of a film of the paste, and the paste film is solidified and heat-treated at a temperature of 300° C. to 500° C., when glass particles are used as a binder, to form a varistor layer or film.

Since the resultant non-linear elements consisting of varistor layers cover a partial area of each picture element electrode, and the residual areas of each picture element are transparent, the transparent display device can be realized.

Usually, each varistor layer is in the form of a convexity extending from the corresponding signal line and picture element electrode toward the corresponding scanning electrode.

Therefore, when the liquid crystal material layer is thin, and thus the outer face of each varistor layer is close to or in contact with the lower face of the corresponding scanning electrode, and a voltage is applied to the signal line, an electric current flows from the signal line to the corresponding scanning electrode through the varistor layer or from the picture element electrode to the corresponding scanning electrode through the varistor layer. This phenomenon causes a reduction in the voltage between the picture element electrode and the corresponding scanning electrode, and the brightness of the liquid crystal material layer is lowered.

The disadvantages become significant with a reduction in thickness of the liquid crystal material layer.

The above disadvantages can be eliminated by the LCD device of the present invention.

Figure 3:
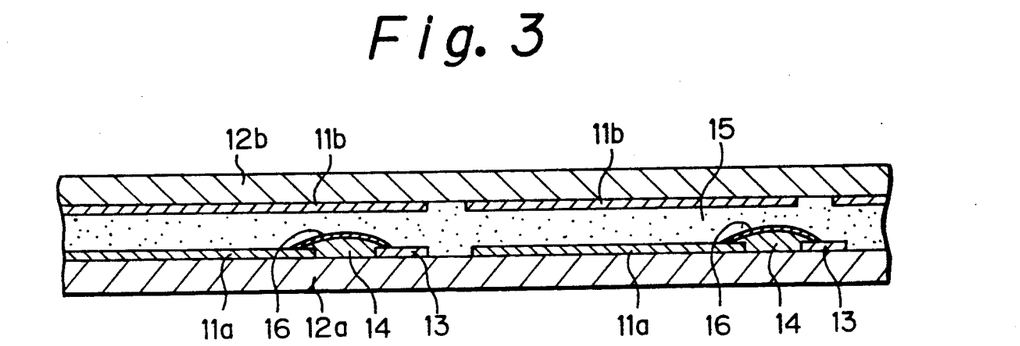
FIG. 3 shows an explanatory cross-sectional view of an embodiment of the LCD device of the present invention.

FIG. 3 is an explanatory cross-sectional view of an embodiment of the LCD device of the present invention.

Referring to FIG. 3, a plurality of picture element electrodes 11a are arranged in a predetermined pattern on an upper surface of a first transparent glass base 12a; a plurality of signal lines 13 for supplying electric signals to the picture element electrodes 11a are arranged adjacent to the picture element electrodes 11a on the first base 12a; a plurality of non-linear elements each consisting of a varistor layer 14 are arranged between and connect the picture element electrodes 11a and the adjacent signal lines 13; a second transparent glass base 12b is arranged in parallel to and spaced from the first base 12a; a plurality of transparent scanning electrodes 11b are fixed to the lower surface of the second base 12b, and the space between the first base 12a and the second base 12b is filled by a liquid crystal material 15.

In this LCD device, insulating membranes 16 are arranged between the varistor layers and the corresponding scanning layers facing the varistor layers. These insulating membranes cause the minimum voltage ($V_{min}$) under which an electric current is allowed to flow between the signal lines 13 and the scanning electrode 11b through positions of the varistor layers 14 extending from the signal lines 13 toward the scanning electrode 11b to be larger than the threshold value voltage (varistor voltage ($V_{th}$)) of portions of the varistor layer 14 located between the signal lines 13 and the adjacent picture element electrodes 11a. Accordingly, under the varistor voltage ($V_{th}$), which is smaller than the $V_{min}$, an electric current can not flow between the signal lines 13 and the scanning electrode, at a right angle to the first and second base 12a and 12b.

This feature of the liquid crystal display device of the present invention very effectively prevents an undesirable flow of an electric current from a signal line to a corresponding scanning electrodes through a corresponding varistor layer, and thus even under a high voltage, a matrix circuit comprising the varistor layer and the liquid crystal material layer can be maintained in a normal condition, and clear images with a high brightness and a high contrast can be displayed.

The material for forming the insulating membrane is not limited to a specific group of insulating substances, but preferably comprises at least one member selected from the group consisting of polyimide resins, polyamide resins, polyethylene resins, polypropylene resins, polyethylene terephthalate resins, polyurethane resins, polyacrylate resins, silicon dioxide, titanium dioxide, aluminum oxide and glasses.

The insulating membrane preferably has a thickness of 0.1 to 5 μm.

Also, the insulating membranes can be formed on the varistor layers, for example, in such a manner that a coating liquid containing an insulating material, for example, an insulating polymeric material, dissolved or dispersed in a solvent is coated on the varistor layers or on lower surfaces of portions of the scanning electrodes facing the varistor layer, and the layer of coating liquid is dried and solidified. In another method, a melt of the insulating material (for example, thermoplastic polymeric material) is applied to the varistor layers or the corresponding scanning electrodes and the resultant insulating material melt layers are solidified by cooling. In still another method, a precursory material for an insulating material, for example, a polyimide resin or silicon oxide, is applied to the varistor layers or the scanning electrodes and the resultant precursory material layers are converted to the insulating material layer by firing. In still another method, a fusible inorganic insulating material, for example, glass, is applied to the varistor layers or the scanning electrodes by a baking method. In yet another method, an insulating material having a very high melting point, for example, aluminum oxide, is applied to the varistor layers or the scanning electrodes by a depositing method or sputtering method. When silicon oxide or polyimide resins, which has a high transparency and insulating property, are employed, the entire surface area of the scanning electrodes may be coated by the above-mentioned transparent insulating materials.

In the LCD device of the present invention, the first transparent base usually comprises a glass plate having a thickness of 0.5 to 2 mm, and the second transparent base usually comprises a glass plate or a transparent plastic film, for example, polyethylenes terephthalate film, having a thickness of 50 to 200 $\mu m$.

The picture element electrodes and the scanning electrode usually comprise ITO (indium tin oxide), and have a thickness of 0.05 to 1 $\mu m$.

The signal lines are usually made from ITO or metallic chromium and have a thickness of 0.01 to 1 $\mu m$.

Usually, the gaps between the signal lines and the adjacent picture element electrodes are from 5 to 400 $\mu m$, for example, about 50 $\mu m$.

The LCD device of the present invention has a liquid crystal material layer arranged between the picture element electrodes fixed on the first base and the scanning electrodes fixed on the second base.

The liquid crystal material preferably comprises liquid crystals responsive to the presence of an electric field, to increase an optical transmission, and surface means for affecting the natural structure of the liquid crystals to induce a distorted alignment thereof in the absence of the electric field to reduce an optical transmission.

This type of polymer-dispersed liquid crystal material includes separate liquid crystal phases dispersed in a matrix consisting essentially of a polymeric material, and a continuous liquid crystal phase filled in network-shaped continuous pores formed in a matrix consisting essentially of a polymeric material as disclosed in T. Kajiyama et al., Chemistry Letter, 679 (1979).

The liquid crystals dispersed in the polymeric matrix include Nematic Curvilinear Aligned Phase (NCAP) type liquid crystals materials in which liquid crystals are dispersed in the form of fine spheres independently from each other in a polymeric matrix; liquid crystals dispersed and contained in a thermoplastic resin; and liquid crystals dispersed in an epoxy resin. The liquid crystals usable for the present invention may be nematic liquid crystals or smectic liquid crystals.

The polymeric material usable as a matrix of the liquid crystal material is preferably selected from polystyrene, polyvinyl chloride, polyvinyl alcohol, polycarbonate, polybutadiene rubber, polymethylmethacrylate, polybutylmethacrylate, polyvinylpyrrolidone, ethyl cellulose, cyanoethyl cellulose, polyvinylidene fluoride, nitrile rubber (NBR) and polyethylene.

In the LCD device of the present invention, the liquid crystal material is preferably the NCAP type liquid crystal material used in combination with the varistor layer.

The polymer dispersed liquid crystal material is disclosed in PCT International Publication No. 83/01016, U.S. Pat. No. 4,435,047 and "Electronic Parts and Materials" No. 12,1987, pages 67 to 70. In the polymer dispersed type liquid crystal material, a liquid crystal material having a positive dielectric anisotropy is surrounded by a transparent surface means or matrix for affecting the natural structure of the liquid crystal material, to induce a distorted alignment thereof in the absence of an electric field and thus reduce the optical transmission. The liquid crystal material is responsive to the presence of an electric field, to increase the amount of optical transmission.

In the polymer dispersed liquid crystal material, the above-mentioned surface means or matrix usually contains discrete amounts of the liquid crystal material dispersed therein, for example, in the form of capsules. Usually, the surface means comprises a transparent organic polymeric material having a refractive index that is nearly equal to the usual refractive index of the liquid crystal material.

The transparent organic polymeric material may comprise a thermoplastic polymer material, for example, a polyester resin, or a thermosetting polymeric material, for example, an epoxy resin.

The polymer-dispersed liquid crystal material layer usually has a thickness of 10 to 30 $\mu m$.

Figure 4A:
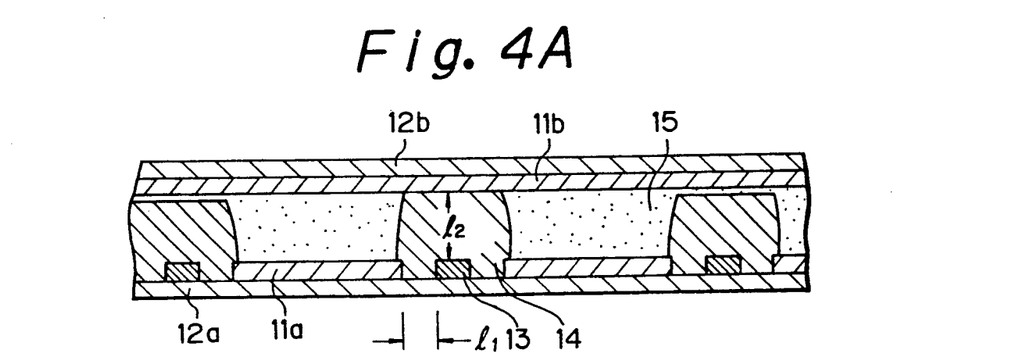
FIG. 4A shows an explanatory cross-sectional view of another embodiment of the LCD device of the present invention.
Figure 4B:
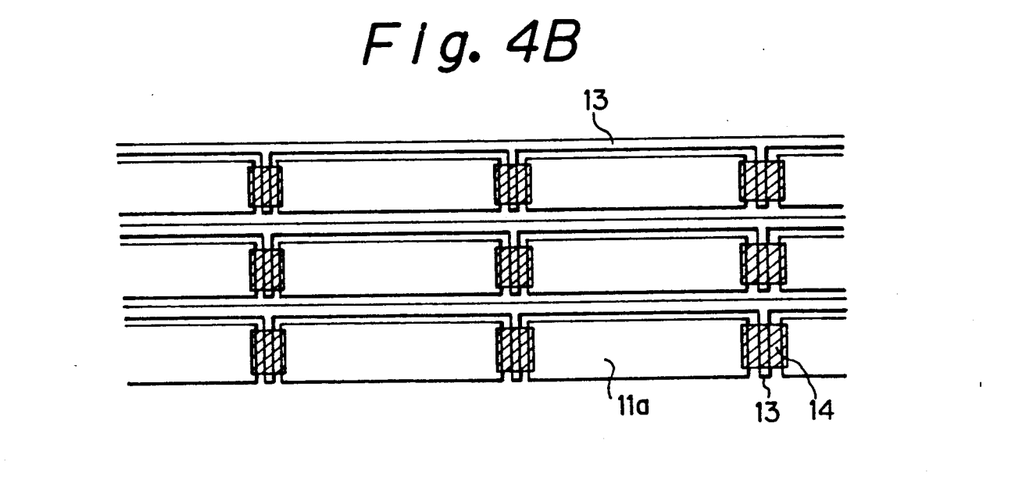
FIG. 4B shows an arrangement of picture element electrodes, signal lines and varistor layers in the LCD device as shown in FIG. 4A.

In another embodiment of the LCD device of the present invention as shown in FIGS. 4A and 4B, a plurality of picture element electrode 11a and a plurality of signal lines 13 are arranged in a predetermined pattern on a first transparent base 12a and are connected with each other through a plurality of varistor layers 14. Also a plurality of transparent scanning electrodes 11b are arranged in a predetermined pattern on a second transparent base 12b arranged in parallel to and spaced from the first base 11a. The space between the first and second bases 12a and 12b are filled by a liquid crystal material layer 15.

In this type of LCD device, the distance ($l_1$) between the signal lines 13 and the adjacent picture element electrodes 11a is smaller than the distance ($l_2$) between the signal lines 13 and the corresponding facing scanning electrodes 11b. Therefore, even where the thickness of the liquid crystal material layer 15 is very thin, and even where the portions of the varistor layers 14 extending from the signal lines 13 toward the corresponding scanning electrodes 11b are in contact with the corresponding electrode 11b, the varistor voltage (threshold value voltage, $V_{th}$) of the portions of the varistor layers located between the signal lines 13 and the adjacent picture element electrodes 11a is always smaller than the minimum voltage ($V_{min}$) under which an electric current is allowed to flow from the signal lines to the corresponding scanning electrodes through at least portions of the varistor layers extending from the signal lines toward the scanning electrodes. The extending portions of the varistor layers need not be in contact with the scanning electrodes.

When the LCD device is operated under substantially the varistor voltage ($V_{th}$), no electric current is allowed to flow from the signal lines to the corresponding scanning electrodes through the extending portions of the varistor layer, and accordingly, normal matrix circuits are formed between the liquid crystal material layer and the varistor layers, and each of the picture elements exhibits a uniform brightness.

Usually, the length ($l_1$) is from 5 to 400 $\mu$m and the distance ($l_2$) is from 5 to 500 $\mu$m and larger than the length ($l_1$).

Figure 5:
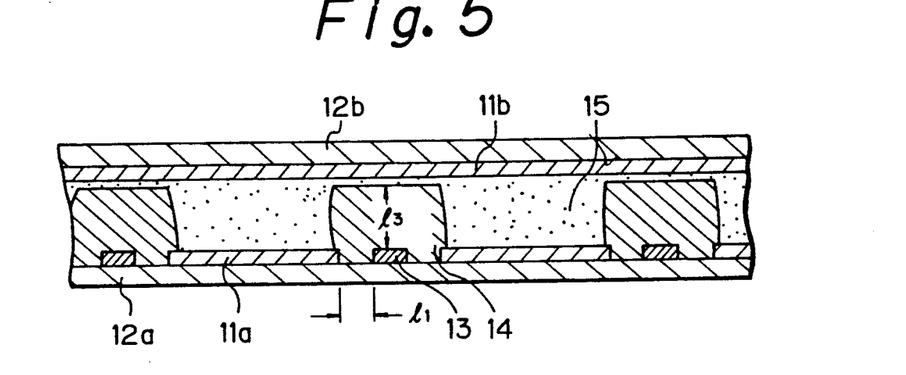
FIGS. 5, 6 and 7 are respectively explanatory cross-sectional views of still another embodiment of the LCD devices of the present invention.
Figure 6:
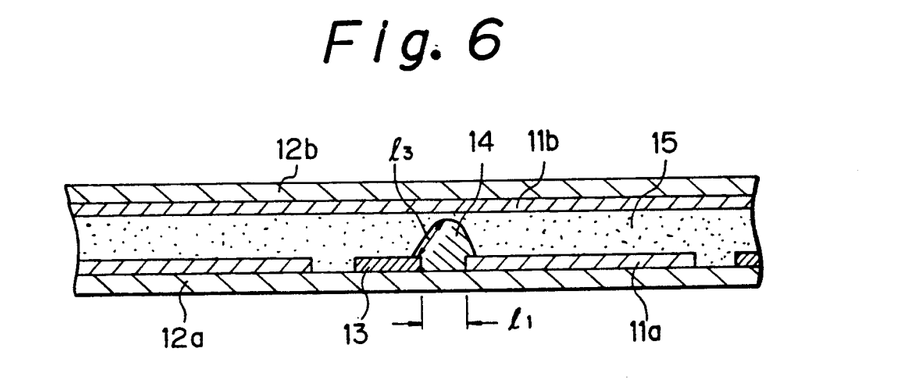

In still another embodiment of the LCD device of the present invention as shown in FIGS. 5 and 6, the distance ($l_1$) between the signal lines 13 and the adjacent picture electrodes 11a is smaller than the thickness ($l_3$) of portions of the varistor layers 14 extending from the signal lines 13 toward the corresponding scanning electrodes 11b. The thickness ($l_3$) of the extending portions of the varistor layers refers to a distance between the upper faces of the signal lines and the peak points of the varistor layers. The thickness ($l_3$) is usually from 5 to 500 $\mu$m.

In the above-mentioned embodiment, the thickness ($l_3$) larger than the length ($l_1$) causes the minimum voltage under which an electric current is allowed to flow from the signal lines to the corresponding scanning electrodes through the extending portion of the varistor layers to be always larger than the varistor voltage of the portions of the varistor layers located between the signal lines and the adjacent picture element electrodes. Therefore while the LCD device is operated, no electric current flows from the signal lines to the scanning electrodes through the extending portions of the varistor layers.

In this embodiment, the extending portions of the varistor layers may be in contact with or not in contact with the corresponding scanning electrode.

Figure 7:
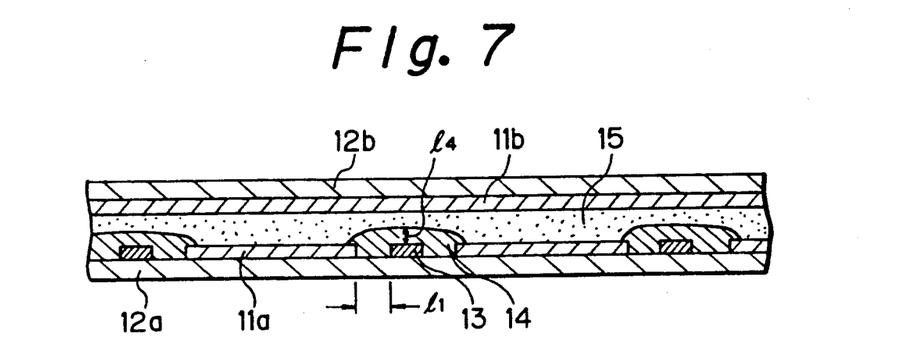

In a still another embodiment of the LCD device of the present invention as shown in FIG. 7, portions of the varistor layers extending from the signal lines toward the corresponding scanning electrodes have a thickness ($l_4$) smaller than the length ($l_1$), between the signal lines and the adjacent picture element electrodes, and the extending portions of the varistor layers are spaced from the corresponding scanning electrodes to an extent such that, when the device is driven under the threshold value voltage applied to the distance between the signal lines and the adjacent picture element electrodes, current is allowed to flow from the signal lines to the corresponding scanning electrodes through the extending portions of the varistor layers and the spaces between the extending portions of the varistor layers and the corresponding scanning electrodes.

The spaces between the extending portions of the varistor layers and the corresponding scanning electrodes are filled by a liquid crystal material, for example, polymer-dispersed liquid crystal material, another polymeric material, inorganic or organic substance or a gas, for example, air or nitrogen gas, or under a vacuum. When the substance filled in the spaces has a high dielectric strength, the space may have a relatively short distance between the extending portion of the varistor layers and the corresponding scanning electrodes. When the substance filled in the spaces has a poor dielectric strength, the distances of the space between the extending portion of the varistor layers and the corresponding scanning electrode should be relatively long.

In a process for producing the LCD device of the present invention, a predetermined amount of an emulsion of a liquid crystal material such as a polymer-dispersed liquid crystal material is applied to a surface of either one of a first base on which a plurality of picture element electrodes, a plurality of signal lines, and a plurality of varistor layers are arranged and fixed in a predetermined pattern, and a second base on which a plurality of scanning electrodes are arranged and fixed in a predetermined pattern, and then the liquid crystal material emulsion-applied base is laminated on and fixed to the other base under a pressure.

In the application of the liquid crystal material emulsion, an emulsion comprising, for example, liquid crystals, an aqueous solution of polyvinyl alcohol, and pleochroic black dye is coated on the surface of the base by using a doctor blade, and then the resultant emulsion layer is dried.

Preferably, the liquid crystal material emulsion is applied to the second base and then a first base is laminated on and fixed to the second base through the liquid crystal material layer.

In the lamination and fixing, the first and second bases are superimposed on each other and pressed together under a pressure of about 0.02 to 30 kg/cm$^2$, more preferably about 1 to 30 kg/cm$^2$ by using, for example, a pressing roller. Alternatively, the laminated first and second bases are pressed under a reduced pressure, to remove air bubbles formed between the two bases.

In another process for producing the LCD device of the present invention, a first base on which a plurality of picture element electrodes, a plurality of signal lines, and a plurality of varistor layers are arranged and fixed in a predetermined pattern, and a second base on which a plurality of scanning electrodes are arranged and fixed in a predetermined pattern, are superposed on each other with a gap having a predetermined thickness therebetween; the side edges of the laminate are sealed by an adhesive agent, while forming a small opening between the superimposed two bases and connected to the space formed between the first and second bases; an emulsion containing liquid crystal dispersed in a polymer precursor is injected into the space between the two bases; and then the polymer precursor in the injected emulsion is cured to convert it to a solid polymer and to provide a liquid crystal material layer.

In the superposing step, the distance between the first and second base is adjusted by using spacers having a predetermined thickness. The varistor layers through which the signal lines are connected to the adjacent picture element electrodes, can be utilized as spacers.

The polymer precursor usable for the above-mentioned process can be selected from photo- or heat-setting polymeric materials, for example, epoxy resin varnishes; photo-setting monomeric materials, for example, 2-ethylhexyl acrylate and dicyclopentenyl acrylate; photo- or heat-setting prepolymers, for example, epoxyacrylate compounds, and mixtures of two or more of the above-mentioned substances. Other polymer precursors which are capable of being cured by a radiation or electron beams, can be utilized for the present invention.

In still another process for producing the LCD device of the present invention, an emulsion comprising liquid crystals dispersed in a polymer precursor is applied to a surface of either one of a first base on which a plurality of picture element electrodes, a plurality of signal lines and a plurality of varistor layers are arranged and fixed in a predetermined pattern, and a second base on which a plurality of scanning electrodes are arranged and fixed in a predetermined pattern; the emulsion-applied base is closely adhered to the other base; and the polymer precursor is cured to convert it to a solid polymer.

The polymer precursor can be selected form the same substances as mentioned above.

EXAMPLES

The present invention will be further explained by way of specific examples, which in no way limit the scope of the present invention.

EXAMPLE 1

On a surface of a transparent second base member on which a plurality of scanning electrodes were arranged and fixed in accordance with a predetermined pattern, an emulsion comprising 20 g of 10% an aqueous solution of polyvinyl alcohol, 5 g of liquid crystals and 0.2 g of a pleochroic black dye was coated by using a 100 μm doctor blade, to form an emulsion layer, and then dried to provide a dried liquid crystal material layer having a thickness of 15 μm.

Separately, on a surface of a transparent first base member on which a plurality of signal lines and a plurality of picture element electrodes were arranged and fixed in a predetermined pattern, a paste comprising varistor particles, glass particles and a binder resin (polyvinyl acetate) was printed in accordance with a predetermined pattern to form a plurality of varistor layers through which the signal lines were connected to the adjacent picture element electrodes. The distance between the signal lines and the adjacent picture element electrodes was 50 μm. The varistor layers had a length of 0.5 mm, a width of 0.5 mm, a thickness of 11 μm±3 μm. The threshold value voltage of the varistor layers connecting the signal lines and the adjacent picture element electrodes was 80 V±2 V.

A liquid comprising an organic silicone compound was applied to the surfaces of the varistor layers on the first base and then fired to provide insulating membranes consisting of silicon dioxide and having a thickness of about 1 μm.

The resultant first base member was superposed on and fixed to the above-mentioned second base member in such a manner that the scanning electrodes on the second base face the varistor layers through the silicon dioxide insulating membrane.

The resultant LCD device was operated by a multiplex drive at a duty ratio of 1/400 under an alternating voltage of ±140 V between the signal lines and the scanning electrodes, and the resultant display images derived to predetermined picture elements had a contrast of 30:1, were very clear, and were without crosstalk.

EXAMPLE 2

The same procedures as in Example 1 were carried out, with the following exceptions.

A coating liquid comprising a photo-setting polyimide precursor was coated on the surface of the second base member on which a plurality of scanning electrodes were arranged and fixed in a predetermined pattern, the coated liquid layer was exposed to light through a photo-mask, developed, and cured.

A plurality of insulating membranes consisting of a polyimide resin were formed on and fixed to the scanning electrodes.

The first and second base members were superposed on each other in such a manner that the varistor layers on the first base face the scanning electrodes on the second base through the polyimide resin insulating membranes.

When the resultant LCD device was operated by a multiplex drive at a duty ratio of 1/400 under an alternating voltage of ±140 V between the signal lines and the scanning electrodes, the picture elements produced clear display images at a contrast of 28:1, without crosstalk.

EXAMPLE 3

An active matrix type LCD device was produced in the following manner.

On a first transparent glass base having a display surface area of 200 mm×256 mm, a plurality of picture element electrodes consisting of ITO and each having a size of 4 mm×1.33 mm, and a plurality of signal lines, were arranged and fixed in accordance with a predetermined pattern by the usual method to provide a first base member. The distance between the signal lines and the adjacent picture element electrodes was 30 μm.

A paste was prepared by mixing a 10 g of varistor particles, 5 g of glass particles, 1.5 g of a binder and 1.5 g of a solvent.

The paste was printed in accordance with the predetermined pattern on the first base member through a masking screen, and sintered at a temperature of 300° C. to 600° C., to form varistor layers through which the signal lines were connected to the adjacent picture element electrodes.

Separately, an emulsion was prepared by mixing 20 g of a 10% aqueous solution of polyvinyl alcohol, 0.2 g of a pleochroic dye, and 5 g of liquid crystals.

A second base member was prepared by arranging and fixing a plurality of scanning electrodes consisting of ITO on a glass or polyethylene terephthalate film base, in accordance with the predetermined pattern.

The emulsion was applied to the second base member, by using a 90 μm doctor blade, and the resultant emulsion layer was dried to provide a liquid crystal material layer having a thickness of 20 μm.

The first and second base members were superimposed on each other at the predetermined positions thereof, and were bonded to each other through an adhesive under a pressing force of 5 kg/cm², by using pressing rollers.

The varistor layers had a threshold value voltage of 80 V, and a thickness of 10 μm±3 μm. The distance between the scanning electrodes and the extending portions of the varistor layer was about 7 μm.

The resultant LCD device was operated by an active matrix drive at a duty ratio of 1/128 under a voltage of ±120 V, and the resultant display images had a contrast at 20 or more and were very clear.

EXAMPLE 4

The same procedures as in Example 3 were carried out, with the following exceptions.

The first and second base members were superimposed, without applying the liquid crystal emulsion to the second base member, by utilizing the varistor layers as spacers, and the side edges of the resultant laminate were sealed by an adhesive agent while leaving an opening for feeding the liquid crystal emulsion into the space formed between the first and second base members, to form a cell.

A precursory resinous mixture was prepared by mixing 40 g of a polymer precursor composed of an epoxy monomer and a curing agent, 1.8 g of a pleochroic black dye and 60 g of liquid crystal.

The emulsion was injected into the space (the distance is 20 μm) formed between the first and second base members, under a reduced pressure, and the resultant laminated was left to stand at room temperature for 24 hours. A black opaque polymer-dispersed liquid crystal material layer was formed.

In the resultant LCD device, the varistor layers had extending portions having a thickness of 15 μm and a threshold value voltage of 80 V.

When the resultant LCD device was operated by an active matrix drive at a duty ratio of 1/128 under a voltage of 180 V, the resultant display images were very clear and exhibited a contrast of 12 or more.

EXAMPLE 5

The same procedures as in Example 1 were carried out, with the following exceptions.

The insulating membrane was not provided.

The liquid crystal material layer having a thickness of 30 μm was formed by using a 120 μm doctor blade.

The distance between the signal lines and the adjacent picture element electrodes was 15 μm, and the thickness of the extending portions varistor layers was 25 μm±5 μm.

The threshold value voltage of the varistor layers was 90 V, and the minimum voltage under which an electric current was allowed to flow from the signal lines to the corresponding scanning lines through the extending portions of the varistor layers was 180 V.

When the resultant LCD device was operated by a multiplex drive at a duty ratio of 1/128 under an alternating voltage of ±140 V, the predetermined picture elements generated very clear display images at a uniform contrast of 30, without cross-talk.

EXAMPLE 6

The same procedures as in Example 4 were carried out, with the following exceptions.

The distance between the signal lines and the adjacent picture element electrodes was 15 μm.

The precursory resinous mixture comprising 40 g of a polymer precursor composed of an epoxy monomer and a curing agent, 1.8 g of a pleochroic black dye, and 60 g of liquid crystals were applied to the second base member.

Then the precursory resinous mixture-applied second base member was superimposed on the first base member while utilizing the varistor layers on the first base member as spacers and while removing air bubbles formed in the resultant laminate by allowing a portion of the precursory resinous mixture to flow out through the side edges of the laminate. The laminate was left to stand at room temperature for 24 hours, to allow the precursory resinous mixture to be cured and to form a liquid crystal material layer having a thickness of 20 μm.

When the resultant LCD device was operated by an active matrix drive at a duty ratio of 1/128 under an alternating voltage of ±180 V, clear display images were created at a contrast of 12.

EXAMPLE 7

The same procedures as in Example 1 were carried out, with the following exceptions.

The insulating membrane was not provided.

The liquid crystal material layer having a thickness of 30 μm was formed by using a 120 μm doctor blade.

The distance between the signal lines and the adjacent picture element electrodes was 15 μm, and the thickness of the extending portions of the varistor layers was 24 μm±3 μm.

The threshold value voltage of the varistor layers was 90 V.

When the resultant LCD device was operated in the same manner as in Example 5, the same satisfactory display effect as in Example 5 was obtained.

We claim:

1. A liquid crystal display device comprising:
   a first transparent base;
   a plurality of picture element electrodes arranged on the first base;
   a plurality of signal lines for supplying electric signals to the picture element electrodes, and arranged adjacent to and spaced from the picture element electrodes on the first base;
   a plurality of varistor layers comprising fine varistor particles, through which the picture element electrodes are connected to the adjacent signal lines;
   a second transparent base arranged in parallel to and spaced from the first base;
   a plurality of scanning electrodes arranged on the second base, facing and spaced from the picture element electrodes; and
   a liquid crystal material layer arranged between the picture element electrodes and the scanning electrodes;
   wherein the distance ($l_1$) between the signal lines and the adjacent picture element electrodes is smaller than the distance ($l_2$) between the signal lines and the corresponding scanning electrodes on the second base whereby said varistor layers connecting the signal lines with the adjacent picture element scanning electrodes exhibit a threshold value voltage ($V_{th}$) smaller than a minimum voltage ($V_{min}$) under which an electric current is allowed to flow between the signal lines on the first base and the scanning electrodes on the second base through at least portions of the varistor layers extending from the signal lines toward the corresponding scanning electrodes on the second base.

2. The device as claimed in claim 1, further comprising insulating membranes arranged between the varistor layers and the corresponding scanning electrodes on the second base.

3. The device as claimed in claim 2, wherein the insulating membranes comprises at least one member selected from the group consisting of polyimide resins, polyamide resins, polyethylene resins, polypropylene resins, polyethylene terephthalate resins, polyurethane resins, polyacrylate resins, silicon dioxide, titanium dioxide, aluminum oxide and glasses.

4. The device as claimed in claim 2, wherein the insulating membrane has a thickness of from 0.1 to 5 μm.

5. The device as claimed in claim 1, wherein the length ($l_1$) between the signal lines and the adjacent picture element electrodes is form 5 to 400 μm and the distance ($l_2$) between the signal lines and the corresponding scanning electrodes on the second base is more than 5 μm but not more than 500 μm.

6. The device as claimed in claim 1, wherein the distance ($l_1$) between the signal lines and the adjacent picture element electrodes is smaller than the thickness ($l_3$) of the portions of the varistor layers extending from the signal lines toward the corresponding scanning electrodes on the second base.

7. The device as claimed in claim 6, wherein the extending portion of the varistor layers are in contact with the scanning electrodes.

8. The device as claimed in claim 6, wherein the extending portions of the varistor layers are spaced from the scanning electrodes.

9. The device as claimed in claim 1, wherein the portions of the varistor layers extending from the signal lines toward the corresponding scanning electrodes on the second base have a thickness ($l_4$) smaller than the distance ($l_1$) between the signal lines and the adjacent picture element electrodes, and the extending portions of the varistor layers are spaced from the corresponding scanning electrodes on the second base to an extent such that, when the device is operated under the threshold value voltage of the varistor layers, no electric current is allowed to flow from the signal lines to the corresponding scanning electrodes on the second base through the extending portions of the varistor layers and the spaces between the extending portions of the varistor layers and the corresponding scanning electrodes on the second base.

10. The device as claimed in claim 9, wherein the distance ($l_1$) between the signal lines and the adjacent picture element electrodes is from 5 to 400 μm and the thickness ($l_4$) of the extending portions of the varistor layers is from 1 to 50 μm.

11. The device as claimed in claim 1, wherein the liquid crystal material comprises liquid crystals dispersed in a matrix consisting essentially of a polymeric material.

12. The device as claimed in claim 1, wherein the liquid crystal material contains pleochroic dyes.

13. The device as claimed in claim 1, wherein the varistor layers is formed by a printing operation from a paste comprising the fine varistor particles.

14. The device as claimed in claim 1, wherein the varistor particles have a size of from 1 to 30 μm.

15. The device as claimed in claim 1, wherein the varistor particles consist of ZnO particles doped with at least one member selected from $Bi_2O_3$, $Co_2O_3$, $MnO_2$ and $Sb_2O_3$.

* * * * *